Figure 1:
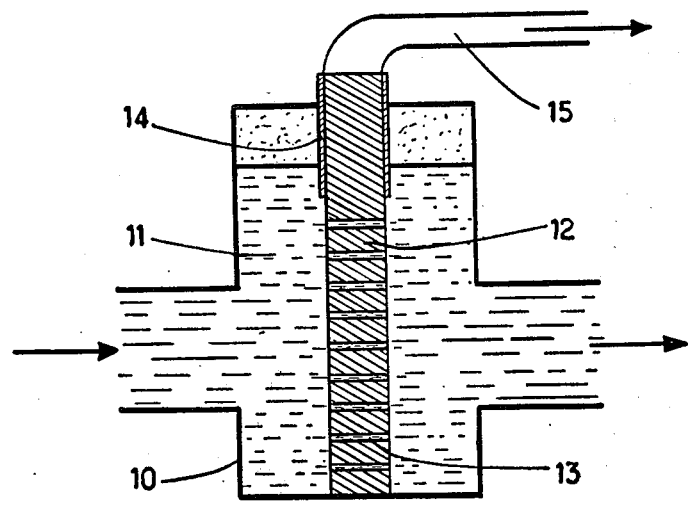

United States Patent [19]
Blum et al.

[11] 3,993,542
[45] Nov. 23, 1976

[54] PROCESS AND APPARATUS FOR EXTRACTION OF GASES PRODUCED DURING OPERATION OF A FUSED-SALT NUCLEAR REACTOR

[75] Inventors: Jacques Blum, Levallois; Jacques Maire, Epinay sur Seine, both of France

[73] Assignees: Pechiney Ugine Kuhlmann; Le Carbone Lorraine, both of Paris, France

[22] Filed: Feb. 6, 1975

[21] Appl. No.: 547,659

[30] Foreign Application Priority Data
Feb. 28, 1974 France .............................. 74.06755

[52] U.S. Cl. .................................. 176/37; 176/49; 55/16
[51] Int. Cl.² ........................ G21C 9/00; G21F 9/04
[58] Field of Search .............. 176/37, 38, 49; 423/5; 55/159, 16

[56] References Cited
UNITED STATES PATENTS

| 3,251,745 | 5/1966 | Teitel ................................... 176/14 |
| 3,271,133 | 9/1966 | Knighton et al. ..................... 75/84.1 |

FOREIGN PATENTS OR APPLICATIONS

| 222,123 | 5/1958 | Australia |
| 585,482 | 10/1959 | Canada |

*Primary Examiner*—Samuel W. Engle
*Assistant Examiner*—Ralph Palo
*Attorney, Agent, or Firm*—Dennison, Dennison, Meserole & Pollack

[57] ABSTRACT

The present invention relates to the field of fused-salt nuclear reactors and its object is the extraction of the gases produced in the course of operation of these reactors.

The process according to the invention consists in placing into position a piece of material permeable for gases and impermeable for the used fused salts, for instance, a piece of graphite, in such a way that part of the surface of this piece is in contact with the circuit of the radioactive salts and another part connected to a gas suction device.

The piece could also be scavenged in its mass by a flow of inert gas.

Application is contemplated in reactors using a mixture of lithium fluoride, beryllium fluoride, and uranium and/or thorium fluoride.

10 Claims, 2 Drawing Figures

PROCESS AND APPARATUS FOR EXTRACTION OF GASES PRODUCED DURING OPERATION OF A FUSED-SALT NUCLEAR REACTOR

The present invention has as its object a process for extraction of tritium, krypton and xenon produced in a fused-salt nuclear reactor.

A fused-salt reactor consists essentially of a tank which may possibly contain piled-up graphite blocks, retarding material for neutrons produced by fission reactions (moderator), in which a mixture of fused substances circulates containing a certain proportion of fissionable material which can be of uranium and/or thorium. When leaving the reactor, these substances, which generally are salts, are drawn in by a circulation pump and sent into a heat exchanger which transfers the energy in thermal form to another fluid which can be formed by a salt mixture, which, in principle, does not give dangerous products after irradiation. A second heat exchanger assures the transfer of the thermal energy into the circuit where it is utilized, for instance that of the steam which feeds an electric generator.

If the operating temperature of the reactor does not exceed 700° C, the primary heat exchanger is normally made of metal, for instance, of an alloy known in the trade as "hastalloy," which consists of nickel and molybdenum with additions of chromium and iron. It is replaced by a graphite heat exchanger if that temperature goes up to 1000° C and more.

A typical mixture of fused salts consists of fluoride of the isotope 7 of the lithium, of beryllium fluoride and of thorium and/or uranium fluoride for the fuel, and of lithium fluoride and of beryllium fluoride only for the intermediate heat carrying fluid whose presence is imposed for safety reasons.

In the course of the fission reactions in the reactor, a certain amount of radioactive gas, tritium, krypton 85 and xenon 135, is produced. The tritium develops principally by the reactions ($n,\alpha$) with the isotopes of the lithium, and, due to the temperature of the operation of the reactor, can diffuse through the metal walls or the graphite walls of the heat exchanger and will finally contaminate the environment by its radioactivity $\beta$ of a period of 12.26 years, and particularly the steam circuit if no appropriate measures are taken. The krypton 85 is directly produced by fission and, particularly indirectly, by very fast $\beta$ decline of selenium and bromine produced by fission; it is also radioactive by emission of $\beta$ of a period of 10.76 years, and this gas cannot accumulate indefinitely in the closed-up enclosure of the reactor without risking disturbances in its functioning. The xenon 135 is also directly produced by fission, and, particularly, by very fast $\beta$ decrease of tellurium and iodine produced by fission; it absorbs many neutrons, its cross section amounting to $2.72 \cdot 10^6$ barns, and it reduces the reactivity of the reactor; it is decomposed by $\beta$ radioactivity in a period 9.2 h in cesium 135, in a period of $3 \cdot 10^6$ years. It is, therefore, necessary to eliminate all these gases from the reactor.

One of the solutions used to date consists of extracting these gases by pulverization of the fused-salt mixture diverted by a small bypass into the helium atmosphere of the pump volume and purging of this helium. Another solution consists of degasing the fused-salt mixture by helium bubbling and to discharge the undesirable gases by the helium flow into a convenient elimination device. The checking of the xenon 135 is the easiest one in view of its relatively short period: it is sufficient to give it 48 hours to go through a container so that it is transformed into cesium 135, except for about 2 or 3%, which will be retained by absorption, for instance on carbon layers put into the container in question. After that, there remains essentially tritium and krypton 85 in the carrier gas which are removed by appropriate absorbent layers using, for instance, titanium at a high temperature for tritium and molecular screens for the krypton. The purified helium can then be recompressed and reused in the purifying circuit of the reactor.

The difficulties in the solutions according to previous art are obvious in accordance with the above description. They require the insertion in the fused-salt circuit of a voluminous pulverization or bubbling installation. Their operation necessitates a gas-liquid separation process which always poses problems difficult to solve due to carried-along liquid particles which form an aerosol, whose destruction must be handled in radioactive surroundings and at a high temperature. Furthermore, various fission products, molybdenum, tellurium, niobium, ruthenium, barium, cerium, iodine, etc., must be removed from the gases; these are found there either in the state of volatile fluoride molecules or they form an aerosol of metallic microparticles.

The object of this invention is to provide a process which supplies a relatively simple solution to the problem of the extraction of gases produced in the course of the operation of a fused-salt nuclear reactor. It only necessitates a minor modification of the fused-salt circuit and permits an efficient and perfect separation of the liquid and the gases.

The process in accordance with the invention consists of using a piece of material permeable to the gases and impermeable to the used fused salts on which it does not react during the operating conditions of the reactor, and to deposit this piece with part of its surface in contact with the salt mixture to be degased and another part in connection with a suction device for the gases and this device directing the gases toward a collection system.

The operating conditions of this new process practically require graphite for the material to be used. The conditions for the permeability for the gases and for the impermeability for the used fused salts are fulfulled by an appropriate selection of the dimensions of the pores of the graphite piece. This selection depends essentially on two factors: the interfacial tension, and the pressure of the fused salts.

It is obviously necessary that the used salt mixture does not moisten the graphite under the operating conditions of the reactor, but it is furthermore necessary that the interfacial liquid-graphite tension, the pressure and the radius of the pores of the graphite are such that the salts cannot penetrate into these pores. For instance, if these salts constitute a mixture of lithium fluoride, beryllium fluoride and thorium and/or uranium fluoride, the interfacial tension is in the order of 0.2 joule/m², a graphite piece is used whose radius of the biggest pores is inversely proportional to the absolute pressure in the fused salts on the level of the used porous piece so that it amounts to 1.5 micron if the absolute pressure in the interior of the reactor amounts to 2 bars and to 0.2 micron if that pressure amounts to 12 bars.

Graphite, whose radius of the biggest pores amounts to 1.5 micron, is already commercially available.

Graphite with finer pores is obtained by using known techniques of impregnation with appropriate products, before the transformation of carbonaceous masses at high temperatures, of carbon or of graphite.

The form and the dimensions of the graphite piece which is permeable to gases and impermeable to the used fused salt must be such that the rate of flow of the gases through the open porousness of the graphite is assured. Industrial graphite has sufficient permeability for the gases and reasonable results are obtained with pieces having sections of reduced surface passage. For the continuous operation of the reactor it is necessary to steadily extract the gases which are collected in the graphite piece. Knowing the volume of these gases and the permeability of the graphite which is easy to measure, the computation of the dimensions of the piece is an easy matter for the expert.

This extraction of the gases which have penetrated into the porousness of the graphite, is facilitated by maintaining a pressure lower than the minimum pressure in the fused salts on part of the surface of the graphite piece which is not in contact with the fused salt bath and the extraction of the gases is still more efficient if this pressure is maintained as low as possible.

Alternatively, one can also develop a gas flow, inert vis-a-vis the materials present, through the graphite piece in order to carry off the gases which have penetrated there. The inert gas preferred for this use is helium. The principle of this removal by carrier gas is well known for the degasing of metals and fused salts and has already been used in the prior art. But in this case here it is a question of a new realization which does not involve the difficulties mentioned above. For this purpose, part of the surface of the porous piece which is neither in contact with the fused salt bath nor in connection with the suction device of the gases, is put into connection with a system that discharges an inert gas. Thus, two gaseous flows are superimposed through the porousness of the graphite piece, one of which goes from the fused salts towards the extractor, and the other from the carrier gas goes also towards the extractor but proceeds from a system that discharges it, possibly after recycling and/or scrubbing.

Figure 2:
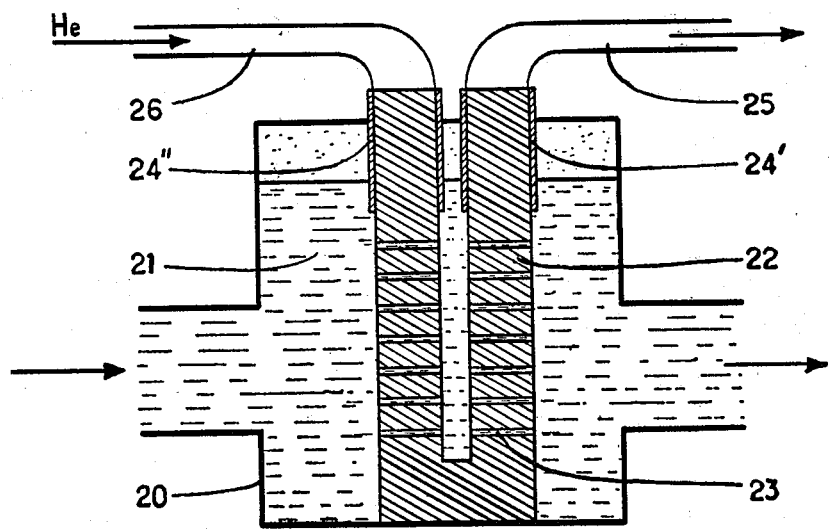

These two possibilities are shown in the figures wherein:

FIG. 1 shows a schematic view of the device in which the gases are extracted from the fused salt bath and drawn towards a collection system; and FIG. 2 shows a schematic view of an alternative device comprising a gas carrier circulation through the piece of porous material.

In FIG. 1 a container 10 is shown which is inserted in the fused salt circuit. This circuit is hermetically closed and actually comprises the tight fused salt jacket 11 from the core of the nuclear reactor, the heat exchanger and all accessories necessary for the handling and smooth operation of the reactor. A piece of porous material such as graphite 12 is plunged into the fused-salt bath 11. The surface contact between the piece 12 and the bath 11 could possibly be increased by any known process such as engraving, with open holes or not into which the fused salts penetrate. In FIG. 1 there is particularly shown the piece 12 through which passes the fused-salt flow by means of the channels 13. The piece of porous material 12 is covered up by a tight covering 14 over its entire part outside the bath 11. The covering could be of pyrocarbon or a metal deposit of "hastalloy." The piece of porous material 12 is connected to a vacuum system which is not shown through a pipe line 15. The gases are here extracted from the porosity of the piece 12 by pumping but any other equivalent process could be used for their extraction.

In FIG. 2, a container 20 inserted in the fused-salt circuit is shown which plays a role identical to that of the container 10 of FIG. 1. A piece of porous material 22 is immersed in the fused-salt bath 21 and the degasing surface is enlarged to its maximum, for instance by channels 23 which pass through the piece 22 and whose role is the same as that of the channels 13 mentioned above. The immersed parts, covered by a tight covering 24′ and 24″ identical to the covering 14, are on one hand connected to a pipe line 25 and a gas sucking system which is not shown, and, on the other hand to a pipe line 26 and a system which discharges helium at a pressure which is not above the pressure prevailing in the container 20. As a result, a continuous helium flow scavenges the piece of porous material 22 and carries along the gases extracted from the fused-salt bath.

The pieces of porous material used can be:

the slow-down moderator of neutrons, or part of it, normally already in graphite. Thus, tritium, krypton and xenon gases can be captured at the point itself where they form but this location is an area of strong neutronic activity where the material is liable to quickly evolve by the Wigner effect and where the available space for the sucking system is reduced by the control devices for the control rods of the reactor;

a special piece in the form of a grille, a screen, etc., through which passes the fused-salt flow. This piece is put at a place with reduced neutronic activity, a place which can be chosen between the core of the reactor and the heat exchanger pertaining to it, where it is best for its accessibility and the geometry of the complete installation, but this leads to a complication for the fused-salt circuit with possibly a charge loss;

the heat exchanger itself if it is of porous material which is obviously the case if the reactor operates at 1000° C with a graphite exchanger. This third possibility does not involve a supplementary piece in the fused-salt circuit and permits the installation of the gas suction system in an area of weaker radioactive environment due to the contact of the system with the other heat carrier fluid. However, it requires that the material of which the heat exchanger is made has, besides its thermal conductivity and used fused-salt impermeability properties, the above mentioned properties of gas permeability. The design of the exchanger must also take into consideration these absolute necessities.

The graphite can be obtained from such designs in a relatively easy way as the below examples indicate.

EXAMPLE I

In a nuclear reactor of 1000 MW using a fused mixture of lithium fluoride, beryllium fluoride and uranium fluoride of ponderable composition LiF 54%, $BeF_2$ 40%, $UF_4$ 6%, about 2400 tritium curies are produced per day (which corresponds to 0.8 ml tritium water $T_2O$ per day), i.e., a tritium gas volume in the order of 50 ml per hour. The krypton and xenon volumes, on their part, are variable but can certainly be estimated to reach an amount comparable to that of the tritium.

This reactor, whose thermal capacity amounts to 2500 to 3000 MW, operates in the neighborhood of 1000° C and the absolute pressure on the level of the heat exchanger is in the order of 12 bars.

The heat exchanger is of the "Polybloc" type, i.e., made of one or a group of graphite blocks through which pass at least two series of tubes, one not going into the other. The primary fluid circulates in one of the series of tubes and the secondary fluid in another series. In the present case, the heat exchanger consists of 280 cubic graphit blocks 500 mm one side placed in one layer of 7 × 5 × 1 m in a vertical plane. At its smallest dimension, horizontal pipe lines pass through the entire assembly through which the radioactive fused-salt mixture flows and vertical pipe lines following the plane of the exchanger which are isolated from the first ones and through which the intermediate heat carrier and nonradioactive fused-salt mixture circulates, identical to the preceding composition but not containing uranium fluoride. The exchange capacity of this unit amounts to 2800 thermal MW with a temperature difference of 150° C between the radioactive fused-salt mixture and the heat carrier fused-salt mixture.

This assembly is made in such a way that the porousness of the residue graphite continues in the entire volume of the heat exchanger and opens into a tight chamber located on one of the remaining small vertical sides of the exchanger and in which a primary vacuum in the order of 10 millibars is maintained by pumping. It goes without saying that the product for the welding of the blocks is used in such a way as to leave free passage for the gas through the entire volume of the heat exchanger.

The used graphite having pores with a diameter below 0.2 micron which corresponds to a permeability of the gases of 0.20 liter per [hour $\times m^2 \times$ ($m$ thickness)$^{-1}$ $\times$ bar], thus up to 2.75 liters/hour are extracted measured under normal temperature conditions and pressure conditions (0° C and 1 bar) of tritium, krypton and xenon.

EXAMPLE II

In the nuclear reactor described in Example I, the absolute pressure on the level of the heat exchanger is reduced by 2 bars and this heat exchanger is placed as in the preceding example.

A third series of pipe lines passes through the assembly of the heat exchanger, horizontal and orthogonal to the pipe lines of the two other series. Half of them open to one of the small free vertical sides of the exchanger and are connected to the gas suction system. The other half opens to the small remaining vertical side of the exchanger and is connected to a system discharging helium; this helium could be recovered from the extraction device after scrubbing in tritium, krypton and xenon and recompression.

The used graphite which this time has pores with a diameter below 1.5 micron has a gas permeability in the order of 20 liters per [hour $\times m^2 \times$ ($m$ thickness)$^{-1}$ $\times$ bar]. By applying a pressure difference of 2 bars between inlet and outlet of the helium gas, with the inlet pressure being always below the minimum pressure of the fused salts of the two circuits on the level of the heat exchanger, a helium discharge twice the estimated air discharge in the order to 300 liters/hour is obtained, i.e., by limiting to about 1% the concentration of the radioactive gas in the helium, an extraction discharge of 2.75 liters/hour of tritium, krypton and xenon is easily obtained, measured at normal temperature and pressure conditions.

We claim:

1. A process for the extraction of gases produced during the operation of a fused-salt nuclear reactor comprising placement of a material which is gas permeable and fused-salt impermeable in the fused-salt circuit of the reactor so that one part of its surface is in contact with the salt mixture to be degased, applying suction to another part of its surface and carrying the gas to a collection system.

2. Apparatus for the extraction of gases produced during the operation of a fused-salt nuclear reactor comprising a container in the fused-salt circuit of the reactor, a piece of porous gas permeable and fused-salt impermeable material in said container, at least part of the surface of said piece of material being in contact with the salt mixture to be degased, suction means connected to another part of the surface of said piece, and collection means to receive the gases passed thereto by said suction means.

3. Apparatus as set forth in claim 2 wherein said piece of porous material is formed of graphite which will not be wetted by the salts due to the superficial tension of the liquid, the largest pores of said piece having a smaller diameter than required for fused salt penetration during reactor operation.

4. Apparatus as set forth in claim 3 wherein the salts are a mixture of lithium fluoride, beryllium fluoride, and thorium and/or uranium fluoride, and wherein the maximum pore radius of the graphite piece is inversely proportional to the absolute pressure in the fused salts at the level of the graphite piece so that if the absolute pressure is 2 bars, the radius will be 1.5 microns, and if the pressure is 12 bars, the radius will be 0.2 microns.

5. Apparatus as defined in claim 2 and further including a supply of inert gas means connecting said supply of inert gas to another part of the surface of said porous piece, so that a flow of said inert gas passes through said piece.

6. Apparatus as set forth in claim 5 wherein said inert gas is helium.

7. Apparatus as set forth in claim 2 wherein said piece of porous material constitutes all or part of the moderator of the nuclear reactor.

8. Apparatus as set forth in claim 2 wherein the piece of porous material is located at a point in the fused-salt circuit between the reactor core and a heat exchanger associated with said reactor.

9. Apparatus as defined in claim 2 wherein said piece of porous material is in the form of a grill or screen and the flow of the fused salts passes therethrough.

10. Apparatus as set forth in claim 2 wherein said piece of porous material constitutes all or part of the heat exchanger associated with the reactor.

* * * * *